United States Patent [19]

Bigay et al.

[11] Patent Number: 5,788,142
[45] Date of Patent: Aug. 4, 1998

[54] PROCESS FOR JOINING, COATING OR REPAIRING PARTS MADE OF INTERMETALLIC MATERIAL

[75] Inventors: Yves Bigay, Verrieres le Buisson; Alain Lasalmonie, L'Hay les Roses, both of France

[73] Assignees: Societe Nationale d'Etude et de Construction de Moteurs d'Aviation "Snecma"; Commissariat a L'Energie Atomique, both of Paris, France

[21] Appl. No.: 724,782

[22] Filed: Oct. 3, 1996

[30] Foreign Application Priority Data

Oct. 4, 1995 [FR] France ............... 95 11650

[51] Int. Cl.$^6$ ............... B23K 23/00; B23K 31/02
[52] U.S. Cl. ............... 228/198; 228/246; 228/193; 419/8; 419/45; 419/54; 419/55; 419/68; 419/69; 427/140; 427/142; 427/226
[58] Field of Search ............... 228/193, 198, 228/246, 248.1, 234.3; 419/8, 9, 45, 54, 55, 68, 69; 427/140, 142, 226; 264/649

[56] References Cited

U.S. PATENT DOCUMENTS

| | | |
|---|---|---|
| 3,335,002 | 8/1967 | Clarke . |
| 3,716,347 | 2/1973 | Bergstrom et al. . |
| 4,294,615 | 10/1981 | Blackburn et al. . |
| 4,580,714 | 4/1986 | Mayer et al. ............... 228/198 |
| 5,040,718 | 8/1991 | Lee et al. ............... 228/119 |
| 5,318,214 | 6/1994 | Lucas, Jr. et al. . |
| 5,564,620 | 10/1996 | Rawers et al. ............... 228/198 |

FOREIGN PATENT DOCUMENTS

| | | |
|---|---|---|
| 0 155 490 | 9/1985 | European Pat. Off. . |
| 0 650 798 | 5/1995 | European Pat. Off. . |
| 4-37658 | 2/1992 | Japan . |
| 955675 | 4/1964 | United Kingdom . |

Primary Examiner—Samuel M. Heinrich
Attorney, Agent, or Firm—Oblon, Spivak, McClelland, Maier & Neustadt, P.C.

[57] ABSTRACT

A process for joining two parts of which at least one is made of an intermetallic material comprises:

- mixing elemental powders to form an intermetallic compound of the same type as that of the intermetallic part or parts;
- compacting and forming an intermediate part from the said compound at a temperature below that of the reaction sintering temperature of the compound;
- placing the intermediate part in position between the two parts to be joined;
- subjecting the assembly of parts to a first thermal cycle so as to effect a reaction sintering of the intermediate part and a consolidation of the assembly; and,
- subjecting the assembly to a second thermal cycle at a temperature above 0.8 of the fusion temperature of said intermetallic compound so as to effect a diffusion treatment and mechanical consolidation of the assembly.

The process may also be adapted to form a coating or a repair of a part using an intermetallic material.

18 Claims, No Drawings

PROCESS FOR JOINING, COATING OR REPAIRING PARTS MADE OF INTERMETALLIC MATERIAL

BACKGROUND OF THE INVENTION

1. Field of the invention

The present invention relates to a process for joining parts made of intermetallic material by reaction sintering, and also relates to the coating or repair of such parts in a similar manner.

Various intermetallic materials have been developed having interesting properties and advantages in certain particular applications, particularly in aeronautics, compared with conventional metallic alloys or superalloys. TiAl, TiNi, NiAl, FeAl and $Ti_3Al$ are examples of such intermetallic materials, and U.S. Pat. No. 4,294,615 describes a TiAl material of this type. Such materials can be shaped by casting or forging, but joining them presents particular difficulties which have been insufficiently resolved.

2. Summary of the Prior Art

The known joining techniques used for conventional metal alloys, and superalloys are found to be unsuitable for these new intermetallic materials. In particular, the joining methods involving fusion, with or without added metal, by means of energy beam, electron beam or laser beam welding, or by means of electric arc using the TIG process, suffer from the drawback of deeply altering the metallurgical structure of the material, and are therefore particularly difficult to use with brittle materials such as intermetallic compounds. Similarly, when joining using brazing or diffusion brazing processes, the added material has a melting point below that of the basic metal, which does not provide metallurgical continuity of the assembly, and may restrict the fields of use, particularly as regards temperature. Other processes, such as diffusion welding and friction welding, require that the joining should be effected in the solid state. However, diffusion welding demands that the surfaces brought together should be of perfect geometric quality, and that the conditions of cleanliness and heat treatment should be very strictly observed. Friction welding demands particular rheological conditions, and is difficult to use in a number of joint configurations.

SUMMARY OF THE INVENTION

It is an object of the invention to provide a process for joining parts made of an intermetallic material which does not suffer the drawbacks of the known processes described above and ensures a sufficient standard of quality to be acceptable in the field of aeronautics.

Accordingly, the invention provides a process for joining two parts, at least one of which is made of an intermetallic material, comprising the steps of:

a) mixing elemental powders so as to obtain a mixture having an overall composition corresponding to that of an intermetallic compound of the same type as that of the said intermetallic material;

b) compacting and forming an intermediate part from said mixture at a temperature lower than the reaction sintering temperature of said intermetallic compound;

c) placing said intermetallic part in position between the two parts of be joined;

d) subjecting the assembly formed in step (c) to a first thermal cycle in a furnace, wherein the temperature, pressure and duration of said cycle are such as to achieve a reaction sintering of said intermediate part and a consolidation of said assembly; and, e) subjecting said assembly to a second thermal cycle in a furnace to effect a diffusion treatment at a temperature higher than that in said first thermal cycle and under conditions for mechanical consolidation of said assembly.

Using additional material in the form of the intermediate part obtained in steps (a) and (b) of the process has numerous advantages, particularly:

the mean composition of the added material may be identical to that of the parts to be joined, or may be adapted to the overall requirements of the intended use of the assembly;

the added material in the form of the intermediate part has an initial ductility which enables it to accommodate defects arising from preparing and bringing the parts together;

in the course of step (d) the reaction sintering of the intermediate part converts the elemental powders into an intermetallic compound which may advantageously be identical to the material of the parts to be joined, or may be adapted to the particular requirements of the intended use of the assembly; and, in step (e) a metallurgical bonding of satisfactory quality is obtained by diffusion under pressure.

The said intermediate part may be obtained by making rolled strips or foils by extrusion and/or rolling to the desired thickness, carried out at low temperature below that of the reaction sintering temperature of the compound. Alternatively the part may be formed by direct compaction of the powder mixture to the desired dimensions, and the compaction may be followed by machining. After the forming of the intermediate part, the final geometric dimensions of this part may be obtained by any standard method, such as cutting or stamping. Making the mixture, and obtaining the precursor intermediate part from the elemental powders may be achieved by any known physico-chemical process, such as mechanical mixing, spraying, co-precipitation of powders, etc.

In step (c) the intermediate part which is placed between the surfaces of the two parts to be joined may be inserted or directly deposited between the two parts. The resulting assembly may be pressed at ambient temperature, or at a temperature which remains below that at which reaction sintering commences, in order to secure a satisfactory bringing together of the parts. The ductility of the intermediate part provides a deformation capacity sufficient to accommodate any defects associated with the parts.

In step (d) the assembly is placed in a furnace and treated in accordance with a first thermal cycle wherein the conditions of temperature, pressure—which may be isostatic or uniaxial—, and duration, are such as to achieve the conversion of the mixture of powders into an intermetallic compound by reaction sintering. The reaction sintering may be carried out without fusion, depending on the type of intermetallic compound involved. At the end of this stage there is obtained a fully intermetallic assembly which is sufficiently consolidated to facilitate handling in subsequent operations.

The final step (e) comprises a diffusion treatment in a furnace in accordance with a second thermal cycle, during which the bonded assembly achieved in the previous step (d) is raised to a temperature higher than in step (d), with or without pressure, to continue the diffusion between the intermediate layer and the metals of the other two parts constituting the assembly, so as to consolidate the assembly mechanically. Preferably, the diffusion treatment is carried out at a temperature in excess of $0.8\ T_f$, where $T_f$ is the absolute fusion temperature of the intermetallic compound used.

When implementing the process in industrial production, the steps which have been described, and particularly steps (d) and (e) involving thermal treatment in a furnace, can be carried out in a continuous sequence, or can be dissociated from each other, which provides flexibility of operation.

DESCRIPTION OF THE PREFERRED EXAMPLES

Example 1

The invention is used to achieve the joining of two parts made of TiAl. An intermediate part providing the joining material is produced as follows:

a) weighing titanium, aluminum and chromium powders in the proportions Ti 631 g, Al 341 g, and Cr 27.4 g, followed by turbulent mixing of the powders for an hour; and, b) compacting the resulting powder mixture by uniaxial compression of the mixture at a pressure of $7 \times 10^2$ MPa, so as to obtain plates 2 mm thick.

In the following step (c), the TiAl parts to be joined are prepared by machining followed by cleaning, and the intermediate part obtained from step (b) is inserted between the two TiAl parts. The assembly obtained is placed in a mild steel casing which is then exhausted and sealed. A very small clearance of less than 0.5% is provided between the casing and the assembly of parts of be joined.

The furnace treatments of steps (d) and (e) are then carried out in sequence in accordance with the following cycle and without pressure:

heating to 600° C., and holding this temperature for an hour to achieve reaction sintering;

then, heating to 1200° C. and holding the temperature for three hours to continue diffusion and increase consolidation.

The assembly is then removed from the casing.

Example 2

This is an alternative embodiment of the invention for joining two parts made of TiAl. As in the previous example, the material for forming the intermediate part is produced in step (a) by weighing titanium, aluminum and chromium powders in the proportions: Ti 631 g, Al 341 g, and Cr 27.4 g, followed by turbulent mixing for one hour.

In step (b) the powder mixture is compacted and shaped as follows:

isostatic compression of the mixture in a latex envelope so as to obtain a billet of 50 mm diameter and 120 mm height;

sheathing the billet of compressed powders in aluminum 10 mm thick in order to protect the powders from oxidation during the following conversion operations;

extrusion of the sheathed billet at 350° C. with a 35×9 mm die, the extrusion ratio being 14;

rolling the extruded product at 350° C. so as to obtain a 0.5 mm thick sheet having a mean composition which corresponds to that of the intermetallic material $Ti_{50}Al_{48}Cr_2$; and, removing the aluminum sheath by shearing.

In the following step (c), the TiAl parts to be joined are prepared by machining followed by cleaning, and the intermediate part obtained from step (b) is inserted between the two TiAl parts. The assembly obtained is placed in a titanium casing which is then exhausted and sealed.

Steps (d) and (e) are then carried out in sequence in a hot isostatic compression enclosure according to the following cycle:

heating to 600° C., and holding this temperature for one hour at a pressure of $10^2$MPa to achieve the reaction sintering;

then heating to 1200° C., and holding the temperature for three hours at a pressure of $1.5 \times 10^2$ MPa to continue diffusion and increase consolidation.

The assembly is then removed from the casing.

Example 3

This example is the same as Example 2, except for the following changes:

in step (b), the billet obtained is subjected directly to a rolling operation at 20° C. to obtain a TiAl sheet with a thickness of 1 mm;

in step (c), the assembly is placed in a hot uniaxial compression tool; and, steps (d) and (e) are performed together with a single treatment carried out in a hot uniaxial compression furnace according to the following cycle;

heating to 1000° C., and holding the temperature for two hours at a pressure of 50 MPa so as to produce reaction sintering and diffusion.

Various modifications can be made to the methods of joining TiAl parts as described in the above examples 1, 2 and 3.

In particular, it will be possible to vary the composition of the powder mixture from which the intermediate part is made to suit the intended use of the final assembly. For example, the following compositions, in atomic percentages, have been tested: Ti52 Al48; Ti48 Al48 Cr2 Nb 2; Ti48 Al48 Cr2 Nb1V1.

Also, it is possible to carry out various combinations of the steps described in the above examples. For example, the making of the intermediate part as described in steps (a) and (b) in one example can be combined with the production of the assembly in accordance with steps (c), (d) and (e) as described in another example. More particularly, the intermediate part of example 1 may be used with the conditions of assembly of either example 2 or example 3, and, similarly, the intermediate part of example 2 or 3 may be used with the conditions of assembly of example 1 or 3, or example 1 or 2 respectively.

Example 4

In this example two parts made of NiAl are joined by a process identical to that described above in Example 2, except as follows:

the material for forming the intermediate part is produced in step (a) by mixing nickel and aluminum in the proportions: Ni 685 g and Al 314 g; and, the casing used in step (c) is made of steel.

The modifications described above for the joining of TiAl parts in examples 1 and 3 may be applied to this example also, either in producing the joining material, or in the reaction sintering and consolidation by diffusion.

Example 5

Two parts made of TiNi are joined by a process which is identical to that described above in Example 4 (including possible modifications), except that the material used for forming the intermediate part is produced in step (a) by mixing nickel and titanium powders in the proportions: Ni 551 g and Ti 449 g.

Example 6

Two parts made of FeAl are joined by a process which is identical to those of examples 4 and 5 or their possible modifications, except that:

in step (a) iron and aluminum powders are mixed in the proportions: Fe 674 g and Al 326 g; and in steps (d) and (e) the temperatures to which the assembly is heated are respectively 600° C. and 1100° C.

Example 7

Two parts made of Ti$_3$Al are joined by a process which is the same as in examples 4, 5 and 6 or their possible modifications, except that:

in step (a) titanium and aluminum powders are mixed in the proportions: Ti 842 g and Al 1158 g; and in steps (d) and (e) the temperatures to which the assembly is heated are respectively 600° C. and 1000° C.

The process of the invention can also be used to join parts made of intermetallic materials other than those used in the examples described above, and particularly materials based on niobium for example.

Example 8

This example shows that the invention can be used to produce a heterogeneous joint between a part made of an intermediate material and a part made of a metallic alloy.

In this example, a TiAl part and a part made of a titanium alloy, for example TA6V, are joined by a process identical to that of Example 7, the composition of the Ti$_3$Al intermediate part also being identical.

As a variant and in order to accommodate deformations and stresses, depending on particular applications, two or three layers of additional material may be used. The compositions envisaged in this example are TiAl, Ti$_3$Al and Ti, each layer being produced in a manner similar to that described in previous examples.

The process of the invention also enables other pairs of parts to be joined, one being an intermetallic part and the other a conventional metallic part. The following heterogeneous joints have been tested in particular: Ti$_3$Al+titanium based alloy; NiAl+nickel based alloy; FeAl+iron based alloy; TiNi+titanium based alloy; TiNi+nickel based alloy.

Example 9

The process of the invention can also be modified for use in forming a coating on a part or in carrying out a repair of a part by adding material to it.

A TiAl coating, or a repair by the addition of TiAl, may thus be carried out in a manner similar to that described hereinabove with reference to example 1, except that the temperature in the second heating step is limited to 1050° C., and in step (c) the intermediate part is simply placed on the part to be coated or on the area of the part to be repaired.

As before, the modifications described above with reference to examples 1 and 3 for the joining of TiAl parts are also applicable in producing a coating or forming a repair.

Example 10

A NiAl coating, or a repair by the addition of NiAl, is carried out in a manner similar to that described hereinabove with reference to example 4, except that the temperature in the second heating step is limited to 1050° C. and in step (c) the intermediate parts, instead of being inserted between two parts to be joined, is simply placed on the part to be coated, or on the area of the part to be repaired. Again, the modifications described above for the joining of two parts as in examples 1 and 3 are also applicable in forming a coating or making a repair.

In addition to forming coatings with TiAl and NiAl, coatings or repairs based on other intermetallic compounds, particularly Ti$_3$Al, FeAl and TiNi, have also been tested, the process being carried out in a manner similar to that previously described for joining parts.

We claim:

1. A process for joining two parts, at least one of which is made of an intermetallic material, comprising the steps of:
   a) mixing elemental powders so as to obtain a mixture having an overall composition corresponding to that of an intermetallic compound of the same type as that of the said intermetallic material;
   b) compacting and forming an intermediate part from said mixture at a temperature lower than the reaction sintering temperature of said intermetallic compound;
   c) placing said intermetallic part in position between the two parts of be joined;
   d) subjecting the assembly formed in step (c) to a first thermal cycle in a furnace, wherein the temperature, pressure and duration of said cycle are such as to achieve a reaction sintering of said intermediate part and a consolidation of said assembly; and,
   e) subjecting said assembly to a second thermal cycle in a furnace to effect a diffusion treatment at a temperature higher than that in said first thermal cycle and under conditions for mechanical consolidation of said assembly.

2. A process according to claim 1, wherein step (b) comprises subjecting said mixture to uniaxial compression so as to obtain a plate having a thickness between 0.5 and 5 mm, preferably 2 mm.

3. A process according to claim 1 wherein step (b) comprises subjecting said mixture to isostatic compression in a latex envelope so as to obtain a billet of compressed powders, sheathing said billet in aluminum, extruding the sheathed billet at 150° C., rolling the extruded material at 350° C. to a thickness of between 0.1 and 5 mm, and removing the aluminum sheath by shearing.

4. A process according to claim 1, wherein step (b) comprises subjecting said mixture to isostatic compression in a latex envelope so as to obtain a billet, and rolling said billet at 20° C. to an intermetallic thickness of between 0.1 and 5 mm.

5. A process according to claim 1, wherein the diffusion treatment temperature in step (e) is in excess of 0.8 T$_f$, where T$_f$ is the absolute fusion temperature of the said intermetallic compound.

6. A process according to claim 1, wherein:
   in step (c) said parts to be joined are prepared by machining, followed by cleansing, prior to placing said intermediate part between said two parts, the assembly is placed in a casing of mild steel leaving a very small clearance of less than 0.5%, and the casing is exhausted and sealed;
   in step (d) said reaction sintering treatment is carried out at 600° C. for one hour, without pressure; and
   in step (e) said diffusion treatment is carried out at 1200° C. for three hours, without pressure, following which said assembly is removed from said casing.

7. A process according to claim 1, wherein:
   in step (c) said parts to be joined are prepared by machining, followed be cleansing, prior to placing said intermediate part between said two parts, the assembly is placed in a titanium casing, and the casing is exhausted and sealed;
   in step (d) said reaction sintering treatment is carried out at 600° C. for one hour at a pressure of between 50 and 150 MPa; and in step (e) said diffusion treatment is carried out at 1200° C. for three hours at a pressure of between 100 and 200 MPa, following which said assembly is removed from said casing.

8. A process according to claim 1, wherein:

in step (c) said parts to be joined are prepared by machining, followed by cleansing, prior to placing said intermediate part between said two parts, and the assembly is placed in a hot uniaxial compression tool;

and steps (d) and (e) are combined in a single reaction sintering and diffusion treatment carried out in a hot uniaxial compression furnace at a temperature of 1000° C. for two hours at a pressure of between 50 and 150 MPa.

9. A process according to claim 1, wherein the two parts to be joined are made of TiAl, and in step (a) the elemental powders comprise titanium, aluminum and chromium, which are mixed in the following proportions, by weight: 631 Ti, 341 Al, and 27.4 Cr.

10. A process according to claim 1, wherein the two parts to be joined are made of NiAl, and in step (a) the elemental powders comprise nickel and aluminum, which are mixed in the following proportions, by weight: 685 Ni and 314 Al.

11. A process according to claim 1, wherein the two parts to be joined are made of TiNi, in step (a) the elemental powders comprise nickel and titanium, which are mixed in the following proportions, by weight: 551 Ni and 449 Ti, and in step (d) the temperature of the reaction sintering treatment is 900° C.

12. A process according to claim 1, wherein the two parts to be joined are made of FeAl, in step (a) the elemental powders comprise iron and aluminum, which are mixed in the following proportions, by weight: 647 Fe and 326 Al, and in step (e) the temperature of the diffusion treatment is 1100° C.

13. A process according to claim 1, wherein the two parts to be joined are made of $Ti_3Al$, in step (a) the elemental powders comprise titanium and aluminum, which are mixed in the following proportions, by weight: 842 Ti and 158 Al, and in step (e) the temperature of the diffusion treatment is 1000° C.

14. A process according to claim 1, wherein the two parts to be joined comprise one part made of TiAl and one part made of titanium alloy, such as TA6V.

15. A process according to claim 14, wherein the intermediate part placed between the two parts to be joined consists of three superimposed layers of material, the first layer being of TiAl, the second layer being of $Ti_3Al$, and the third layer being of Ti.

16. A process according to claim 14, wherein the intermediate part placed between the two parts to be joined consists of two superimposed layers of material selected from the group consisting of TiAl, $Ti_3Al$ and Ti.

17. A process for providing a part with a coating of an intermetallic material selected from the group consisting of TiAl, NiAl, $Ti_3Al$, FeAl and TiNi, comprising the steps of:

a) mixing elemental powders so as to obtain a mixture having an overall composition corresponding to that of said intermetallic material;

b) compacting and forming an intermediate part from said mixture at a temperature lower than the reaction sintering temperature of said intermetallic material;

c) placing said intermediate part on the part to be coated;

d) subjecting the assembly formed in step (c) to a first thermal cycle in a furnace, wherein the temperature, pressure and duration of said cycle are such as to achieve a reaction sintering of said intermediate part and a consolidation of said assembly; and, e) subjecting said assembly to a second thermal cycle in a furnace to effect a diffusion treatment at a temperature higher than that in said first thermal cycle and under conditions for mechanical consolidation of said assembly.

18. A process of repairing a part with an intermetallic material selected from the group consisting of TiAl, NiAl, $Ti_3Al$, FeAl, and TiNi, comprising the steps of:

a) mixing elemental powders so as to obtain a mixture having an overall composition corresponding to that of said intermetallic material;

b) compacting and forming an intermediate part from said mixture at a temperature lower than the reaction sintering temperature of said intermetallic material;

c) placing said intermediate part on the region of the part to be repaired;

d) subjecting the assembly formed in step (c) to a first thermal cycle in a furnace, wherein the temperature, pressure and duration of said cycle are such as to achieve a reaction sintering of said intermediate part and a consolidation of said assembly; and, e) subjecting said assembly to a second thermal cycle in a furnace to effect a diffusion treatment at a temperature higher than that in said first thermal cycle and under conditions for mechanical consolidation of said assembly.

* * * * *

UNITED STATES PATENT AND TRADEMARK OFFICE
CERTIFICATE OF CORRECTION

PATENT NO. : 5,788,142

DATED : August 4, 1998

INVENTOR(S): BIGAY ET AL

It is certified that an error appears in the above-identified patent and that said Letters Patent is hereby corrected as shown below:

Column 1, line 62, "parts of be joined" should read --parts to be joined--.

Column 3, line 26, "parts of be joined" should read --parts to be joined--.

Column 6, line 16, "parts of be joined" should read --parts to be joined--.

Signed and Sealed this

Twenty-fifth Day of May, 1999

Attest:

Q. TODD DICKINSON

*Attesting Officer*    *Acting Commissioner of Patents and Trademarks*